United States Patent [19]

Ellis

[11] Patent Number: 4,825,468
[45] Date of Patent: Apr. 25, 1989

[54] VIDEO NOISE JAMMER

[75] Inventor: William H. Ellis, Jupiter, Fla.

[73] Assignee: Broadband Engineering, Inc., Jupiter, Fla.

[21] Appl. No.: 923,131

[22] Filed: Oct. 24, 1986

[51] Int. Cl.⁴ .................................... H04L 9/00
[52] U.S. Cl. ................................. 380/7; 380/6
[58] Field of Search ............................ 380/6, 7

[56] References Cited

U.S. PATENT DOCUMENTS

| | | | |
|---|---|---|---|
| 2,400,950 | 5/1946 | Purington | 179/1.5 |
| 2,905,747 | 9/1959 | Kidd | 178/5.1 |
| 2,956,110 | 10/1960 | Shanahan | 178/5.1 |
| 3,059,054 | 10/1962 | Reiter | 179/1.5 |
| 3,067,280 | 12/1962 | Schlafly, Jr. | 178/5.1 |
| 3,202,758 | 8/1965 | Brownstein | 178/5.1 |
| 3,391,339 | 7/1968 | Lynch | 325/49 |
| 3,681,708 | 8/1972 | Olmstead | 331/78 |
| 3,899,633 | 1/1983 | Sorenson et al. | 380/7 |
| 4,074,311 | 2/1978 | Tanner | 358/118 |
| 4,148,064 | 4/1979 | Reed | 358/118 |
| 4,179,658 | 12/1979 | Bitzer | 325/34 |
| 4,367,557 | 1/1983 | Stern | 455/4 |
| 4,429,331 | 1/1984 | Kanai | 358/124 |
| 4,434,436 | 2/1984 | Kleykamp | 358/118 |
| 4,550,222 | 10/1985 | Hanni et al. | 380/6 |
| 4,644,396 | 2/1987 | Iwsaki | 380/6 |
| 4,651,204 | 3/1987 | Uemura | 380/7 |
| 4,674,124 | 6/1987 | Horrall et al. | 380/6 |

Primary Examiner—Salvatore Cangialosi
Attorney, Agent, or Firm—Weingarten, Schurgin, Gagnebin & Hayes

[57] ABSTRACT

A multichannel signal distribution control system, such as a CATV system, providing a plurality of video signal channels wherein selected channels are obscured by random noise jammer signals. The signal distribution system includes multiple output ports, each port connected to a respective user or subscriber. The random noise jammer signal is provided by a band-limited noise source and a signal translator which provides a noise signal band corresponding to the frequency of the channel to be selectively disabled. The resulting noise signal is added to the signals for specific individual subscriber output ports to obscure the signal on the selected channel of that individual subscriber. The multichannel signal distribution control system is controlled by signals provided remotely from a home office to each local jamming device by control signals superimposed on the multiple channel signal feed line.

4 Claims, 2 Drawing Sheets

VIDEO NOISE JAMMER

FIELD OF THE INVENTION

The present invention relates to secure video signal distribution systems and, in particular, to multichannel signal distribution control systems providing random noise jamming of selected information channels.

BACKGROUND OF THE INVENTION

Broadband, multichannel signal distribution systems provide secure channel signal allocation to selected subscribers. In the past, security of the channel information has been provided by two methods, either passive trapping or removal of the channel information, or signal jamming or obscuring the channel information with a secondary signal to make the channel information unusable In passive trapping, an electronic band-stop filter is installed in the customer's connection (drop) to eliminate those signals which the customer is not authorized to receive. The passive trap is typically installed at the drop, and may be actuated at the drop either manually or electronically by a control signal from a remote control point. However, signal traps are subject to frequency drift under changing temperature, and the temperature drift causes the signal trap to drift from the carrier frequency, thus allowing unauthorized customer access to the channel. Moreover, as signal traps tend to be quite wide in bandwidth at higher frequencies, the use of such filters is made economically unfeasible or, alternately, makes the adjacent channels also unusable.

Signal jamming typically provides a narrow band continuous wave (CW) carrier or modulated carrier which is added to the signal channel of interest. To recover the signal, the authorized customer is given a narrow band trap to remove the jamming signal. However, the trap used to remove the jamming is also subject to temperature drift. When the drift occurs, a recovered signal could become unusable or marginally usable. Moreover, the trap may remove not only the jamming carrier but also some of the desired signal, thus degrading the quality of the received signal. Furthermore, since a trap of this nature is installed at the customer location, a customer having electronic knowledge can easily design a device to remove the jamming signal and thus recover the desired signal without authorization.

SUMMARY OF THE INVENTION

The multichannel signal distribution control system according to the present invention completely obscures the selected channel or channels by providing a band-limited noise signal to mask the selected channel signal. Signal parameters are easily maintained such that the jamming noise signal is limited only to the desired channel or channels, and problems arising due to temperature drift or instability are avoided. Moreover, the obscured signal is unrecoverable by customer apparatus since the obscuring signal contains no coded key and is not limited to a narrow frequency band.

The apparatus according to the present invention comprises a baseband noise generator having a noise signal band-limiting filter. The resulting band-limited noise source is translated to the channel of interest by a signal translator. Each drop includes at least one signal translator for each secured channel or group of channels to be controlled. The frequency translator comprises a local oscillator of a frequency corresponding to the center of the desired channel or group of channels. The local oscillator signal and the baseband signal are received by a balanced mixer to provide the noise source at the selected channel(s) frequency and to suppress the other mixer signal components in the mixer output signal The resulting translated noise signal and a portion of the incoming wideband multichannel signal are combined to provide the user with all signal channels provided by the multichannel distribution system, plus the selected frequency noise jamming signal at the specified channel(s) to be selectively obscured.

The translated noise sources are remotely controlled by a coded signal provided along the multichannel signal feed from the home office as received and decoded by a signal decoder and jammer control processor unit.

DESCRIPTION OF THE DRAWING

These are other features according to the present invention will be further understood by reading the following detailed description of the invention, taken together with the drawing wherein.

DETAILED DESCRIPTION OF THE INVENTION

Figure 1:
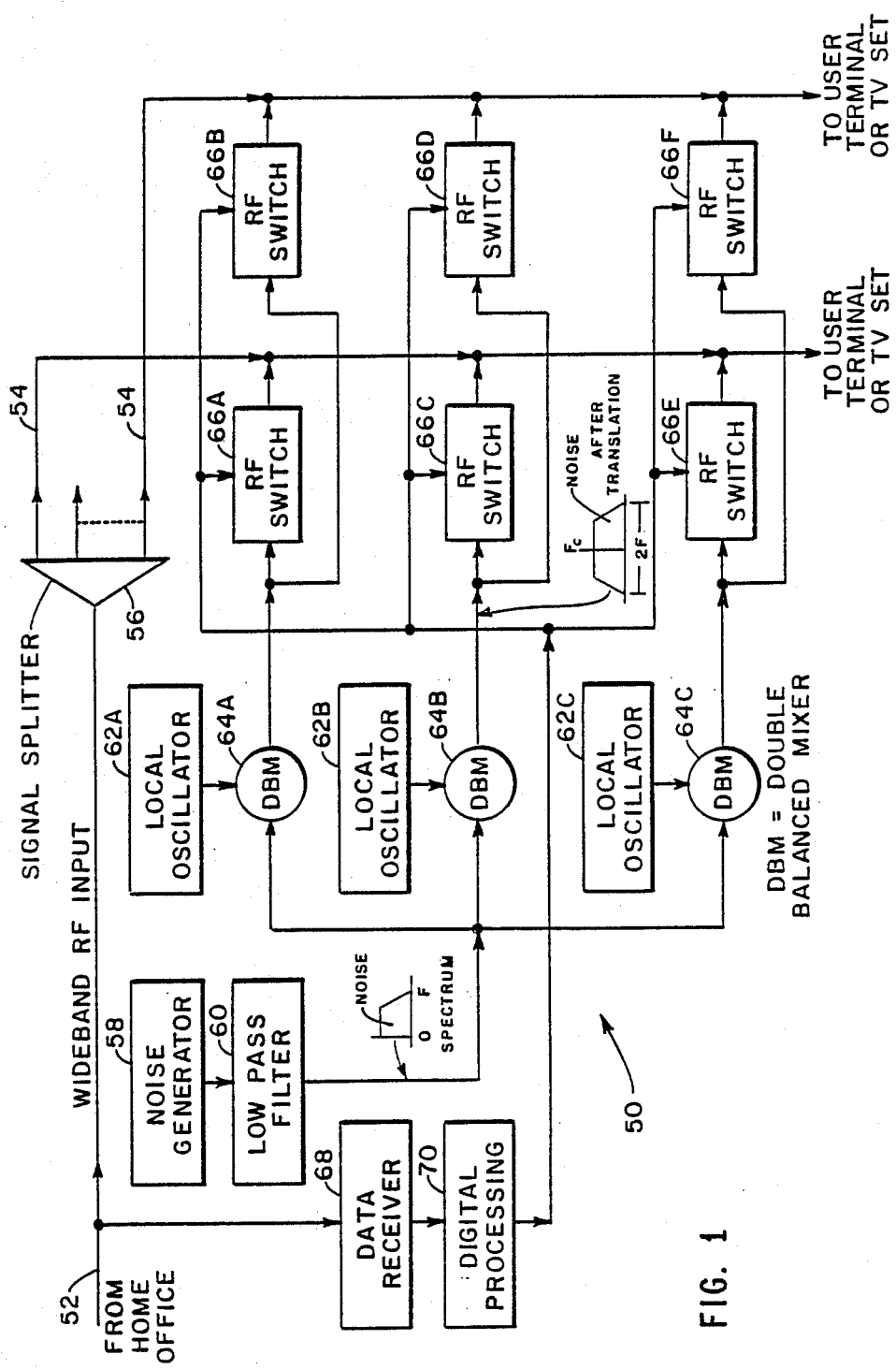
FIG. 1 is a block diagram of one embodiment of the present invention.

The block diagram of one embodiment of the present invention is shown in FIG. 1, wherein the multiple channels of video signals are received from the home office (not shown) along a signal path 52, from which a plurality of signals 54 are provided by a signal splitter 56, or single signal 54 without the signal splitter 56. Broadband white noise is provided by a noise generator 58 and filtered by a low pass filter 60 to provide a white noise signal having a signal bandwidth no greater than half of the signal bandwidths provided along the signal path 52, which is to be selectively obscured. Each channel to be selectively controlled is accompanied by a respective local oscillator 62A, 62B and 62C, which provide a CW signal at the center frequency of the channel to be selectively obscured. The oscillator signal from each local oscillator is combined with the band-limited white noise source from the low pass filter 60 in respective double-balanced mixers 64A, 64B and 64C to provide a translated band-limited white noise signal at a frequency corresponding to the frequencies of the channel to be selectively obscured. The resulting translated white noise is received by an RF switch to selectively place the noise signal on a signal containing the wideband multichannel signal to be distributed. In addition, a plurality of contiguous channels may be obscured by noise by providing an appropriately wider bandwidth filter 60. Each signal drop or user terminal requires as many switches as there are channels to be controlled. In the present embodiment, two drops are shown, each having three channels to be controlled so that six RF signal switches 66A–66F are provided.

The obscuring of the selected channel is provided by enabling the particular RF switch 66A–66F in response to a control signal derived from signals encoded in the input path 52. The control signal is provided by an encoded signal received from the wideband RF signal path 52 by data receiver 68 which provides a baseband coded signal to be processed by the digital processor 70.

The resulting control signals from processor 70 selectively enable one or more of the RF switches 66A–66F according to the coded signals provided on the wideband input path 52. The unscrambled channels are unaffected by the above-described process.

Figure 2:
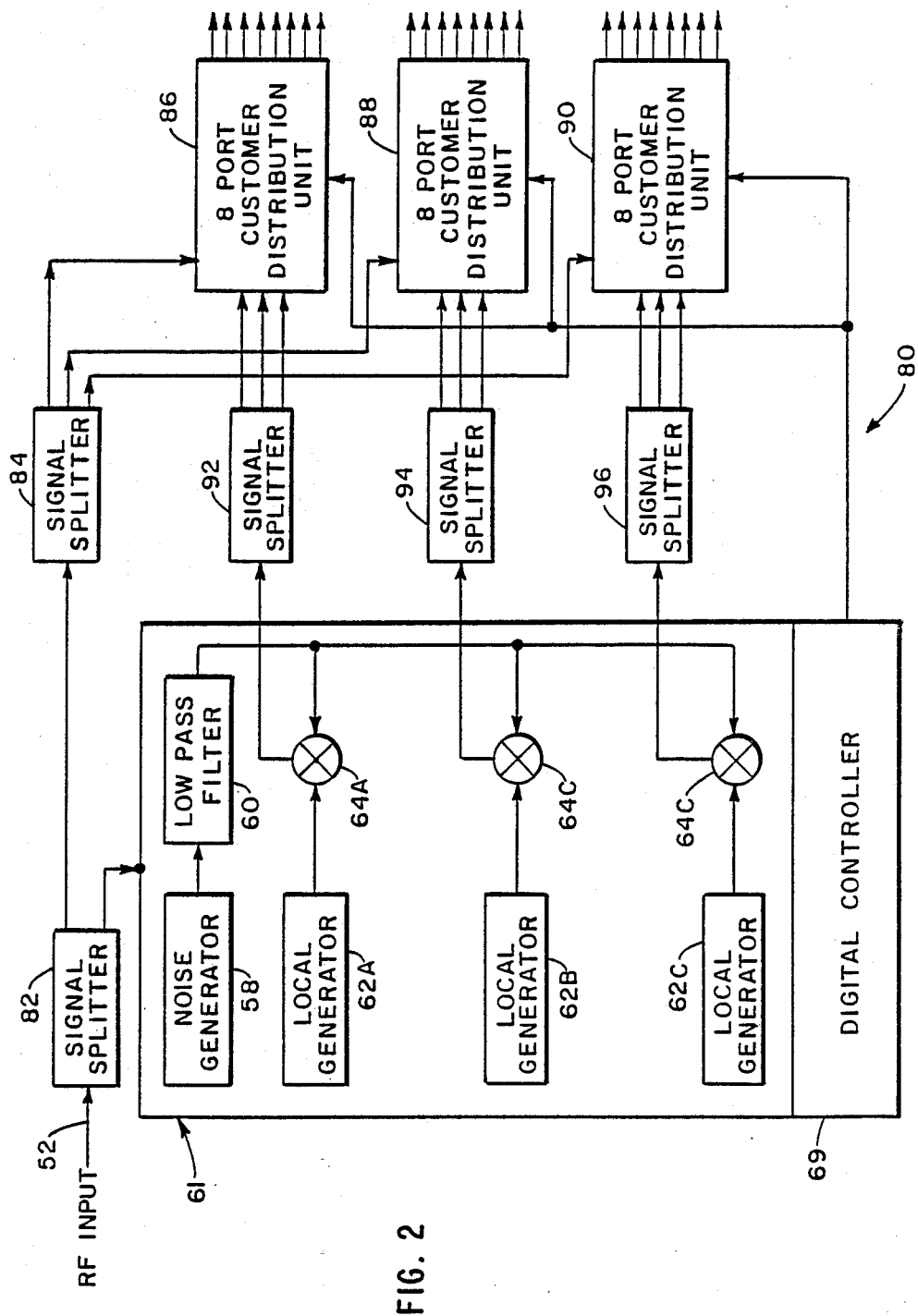
FIG. 2 is a block diagram of a second embodiment according to the present invention.

An alternate embodiment is shown in FIG. 2 wherein the multichannel RF signal is received from the path 52 by a signal splitter 82, providing a portion of the received multichannel RF input to a subsequent signal splitter 84, thus providing multiple multichannel RF signals to a plurality of multi-port customer distribution units 86, 88 and 90. The embodiment of FIG. 2 provides an implementation having fewer components by sharing of the local oscillators, mixers, etc. As discussed with the previous embodiment, a plurality of band-limited noise signals of selected frequencies are provided by a white noise generator 58 having a low pass filter 60 thereafter to limit the bandwidth of the noise signal to be limited to half of the signal bandwidth of the channel(s) to be selectively obscured. The resulting band-limited baseband white noise is received by double-balanced mixers 64A–64C, which also receive respective local oscillator CW signals produced by corresponding local oscillators 62A–62C. The resulting band-limited noise signals are received by signal splitters 92, 94 and 96 which provide multiple band-llimited noise signals to each of the multi-port customer distribution units 86–90. The signal provided to the customer from each output of the customer distribution units includes the signals corresponding to the multichannel RF input received at input 52, together with the selectively applied band-limited noise signal provided by digitally controlled RF switches located in each multi-port customer distribution unit.

These and other embodiments, substitutions or modifications made by one skilled in the art are considered to be within the scope of the present invention. For instance, the oocal oscillators 62A–62C may incorporate a frequency 8 multiplexed frequency synthesizer wherein a single oscillator would be used to jam a plurality of signal channels. Moreover, the number of signal drops to user terminals or the number of band-limited signals produced as shown in FIGS. 1 and 2 is shown for illustration for purposes only, and a greater or lesser number may be provided. Furthermore, through the use of a second baseband noise filter, a wider noise band can be selectively translated to obscure a group of adjacent signal channels. Therefore, the present invention is not to be limited except by the claims which follow.

What is claimed is:

1. A multichannel signal distribution control system for providing a multichannel signal to channels of a subscriber, comprising:
    means for distributing said multichannel signal to subscriber, comprising:
    a random noise generator providing a band limited random noise signal having a limited bandwidth corresponding to a predetermined portion of the bandwidth of each channel to be selectively obscured;
    oscillating means for providing a periodic signal for each channel to be selectively obscured;
    means for translating said random noise signal and said periodic signal to produce a translated noise signal to said each channel corresponding to said periodic signal of the respective said multichannel signal distribution control system to be selectively obscured according to a control signal; and
    means for combining said translated noise signal with said multichannel signal to provide an obscured multichannel signal to subscriber.

2. The multichannel signal distribution control system of claim 1, further including control means comprising:
    a data receiver providing a baseband code signal derived from said multichannel signal; and
    a code signal processor providing said control signal from said baseband code signal for control of said translating means.

3. The multichannel signal distribution control system of claim 1, wherein said means for translating comprises:
    mixer means for combining said random noise signal and said periodic signal to provide said translated noise signal; and
    RF switch means for enabling each channel to be selectively obscured in response to said control signal to provide said translated noise signal at said selected channel to be obscured.

4. The multichannel signal distribution control system of claim 1 wherein said random noise generator is a white noise generator and wherein said random noise signal provided thereby is a white noise signal.

* * * * *

UNITED STATES PATENT AND TRADEMARK OFFICE
CERTIFICATE OF CORRECTION

PATENT NO. : 4,825,468
DATED : April 25, 1989
INVENTOR(S) : William H. Ellis

It is certified that error appears in the above-identified patent and that said Letters Patent is hereby corrected as shown below:

Column 2, line 7, "signal The" should read --signal. The--.

Column 3, line 26, "band-llimited" should read --band-limited--.

Column 3, line 38, "oocal" should read --local--.

Column 3, line 39, "frequency 8 multiplexed" should read --frequency multiplexed--.

Signed and Sealed this

First Day of October, 1991

Attest:

HARRY F. MANBECK, JR.

Attesting Officer

Commissioner of Patents and Trademarks